United States Patent [19]
Goodwin, III et al.

[11] Patent Number: 5,943,654
[45] Date of Patent: Aug. 24, 1999

[54] METHOD OF DISPLAYING PROMOTIONAL MESSAGES BY ELECTRONIC PRICE LABELS

[75] Inventors: John C. Goodwin, III, Suwanee; Terry L. Zimmerman, Lawrenceville, both of Ga.

[73] Assignee: NCR Corporation, Dayton, Ohio

[21] Appl. No.: 08/766,388

[22] Filed: Dec. 9, 1996

[51] Int. Cl.[6] ................................................. G06F 17/60
[52] U.S. Cl. .................................. 705/14; 705/14; 705/20
[58] Field of Search .................................. 705/14, 16, 21, 705/20; 235/383, 382, 382.5; 340/825.35, 825.52, 825.55

[56] References Cited

U.S. PATENT DOCUMENTS

| | | | |
|---|---|---|---|
| 4,002,886 | 1/1977 | Sundelin | 235/61.7 R |
| 4,500,880 | 2/1985 | Gomersall et al. | 340/825.35 |
| 4,825,045 | 4/1989 | Humble | 235/383 |
| 4,924,363 | 5/1990 | Kornelson | 362/125 |
| 5,172,314 | 12/1992 | Poland et al. | 364/401 |
| 5,348,485 | 9/1994 | Briechle et al. | 439/110 |
| 5,401,947 | 3/1995 | Poland | 235/383 |
| 5,448,226 | 9/1995 | Failing, Jr. et al. | 340/825.35 |
| 5,532,465 | 7/1996 | Waterhouse et al. | 235/383 |
| 5,619,416 | 4/1997 | Kararew | 364/478.13 |
| 5,632,010 | 5/1997 | Briechle et al. | 345/1 |

OTHER PUBLICATIONS

Evans, J.G. et al. "A low-cost radio for an electronic price label system", Bell Labs Technical Journal, Sep. 1, 1996.

Margaret Austin,"Electronic Retailing Systems International announces action on patents related to electronic shelf label technology", Business Wire, Sep. 26, 1995.

*Primary Examiner*—Allen R. MacDonald
*Assistant Examiner*—Romain Jeanty
*Attorney, Agent, or Firm*—Paul W. Martin

[57] ABSTRACT

A method of assigning a promotional message to an electronic price label (EPL) which uses a promotional indicator in a price file to access a promotional message in a promotional message data file. The method includes the steps of storing promotional messages and associated promotional indicators in a promotional data file, storing one of the promotional indicators in an item record within a price file, reading the price file to obtain the one promotional indicator, comparing the one promotional indicator with the promotional indicators in the promotional data file to obtain a promotional message that is associated with the one promotional indicator, and causing the EPL to display the promotional message.

8 Claims, 5 Drawing Sheets

METHOD OF DISPLAYING PROMOTIONAL MESSAGES BY ELECTRONIC PRICE LABELS

CROSS-REFERENCE TO RELATED APPLICATION

The present invention is related to the following commonly assigned and co-pending U.S. application:

"System and Method of Obtaining Information From A Price Look-up File", filed Oct. 5, 1995, invented by Goodwin et al., and having a Ser. No. 08/539,449.

BACKGROUND OF THE INVENTION

The present invention relates to electronic signage, and more specifically to a method of displaying promotional messages by electronic price labels (EPLs).

EPL systems typically include a plurality of EPLs for each merchandise item in a store. EPLs typically display the price of corresponding merchandise items on store shelves and are typically attached to a rail along the leading edge of the shelves. A store may contain thousands of EPLs to display the prices of the merchandise items. The EPLs are coupled to a central server from where information about the EPLs is typically maintained in an EPL data file. Price information displayed by the EPLs is obtained from the PLU file.

During special promotions, EPL systems cannot display the correct price, particularly in the case of promotions such as "buy one, get one free" (BOGO). For example, if the cost of an item is one dollar during a BOGO promotion, the manager of the transaction establishment cannot display a price of fifty cents to imply that each of two purchased items is fifty cents, nor can the manager display a price of one dollar to imply that two purchased items may be purchased for one dollar.

Thus, a promotional message which is printed on a paper shelf talker or bib and which explains the promotion must be placed adjacent the EPL for the item. However, paper shelf talkers must be installed manually, thereby increasing the cost and setup time associated with special promotions.

Therefore, it would be desirable to provide a method of displaying promotional messages to EPLs so that the EPLs display promotional messages instead of paper shelf talkers.

SUMMARY OF THE INVENTION

In accordance with the teachings of the present invention, a method of displaying promotional messages to electronic price labels is provided.

The method includes the steps of storing promotional messages and associated promotional indicators in a promotional data file, storing one of the promotional indicators in an item record within a price file, reading the price file to obtain the one promotional indicator, comparing the one promotional indicator with the promotional indicators in the promotional data file to obtain a promotional message that is associated with the one promotional indicator, and causing the EPL to display the promotional message.

Causing the EPL to display the promotional message involves the steps of transmitting a message addressed to the EPL which contains the promotional message, receiving and acknowledging the transmitted message by control circuitry within the EPL, storing the promotional message by the control circuitry, and displaying the promotional message by the control circuitry.

Reading the price file to obtain the one promotional indicator involves the substeps of executing a price file reading program which reads the price file, providing an application programming interface (API) having hooks into the price file reading program, and causing the price file reading program to read the price file to obtain the one promotional indicator by the API.

It is accordingly an object of the present invention to provide a method of displaying promotional messages to electronic price labels.

It is another object of the present invention to provide a method of displaying promotional messages to electronic price labels that uses a generic PLU file reader program.

It is another object of the present invention to provide a method of displaying promotional messages that involves the use of an indexed list of promotional messages, any one of which can be assigned to a particular EPL.

It is another object of the present invention to provide a method of displaying promotional messages to electronic price labels that makes paper shelf talkers unnecessary.

It is another object of the present invention to provide a method of displaying promotional messages to electronic price labels that provides automatic and single-point control by using a generic PLU file reader.

It is another object of the present invention to provide a method of displaying promotional messages to electronic price labels that uses templates to customize and produce any type of possible message.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

DETAILED DESCRIPTION OF THE PREFERRED EMBODIMENT

Figure 1:
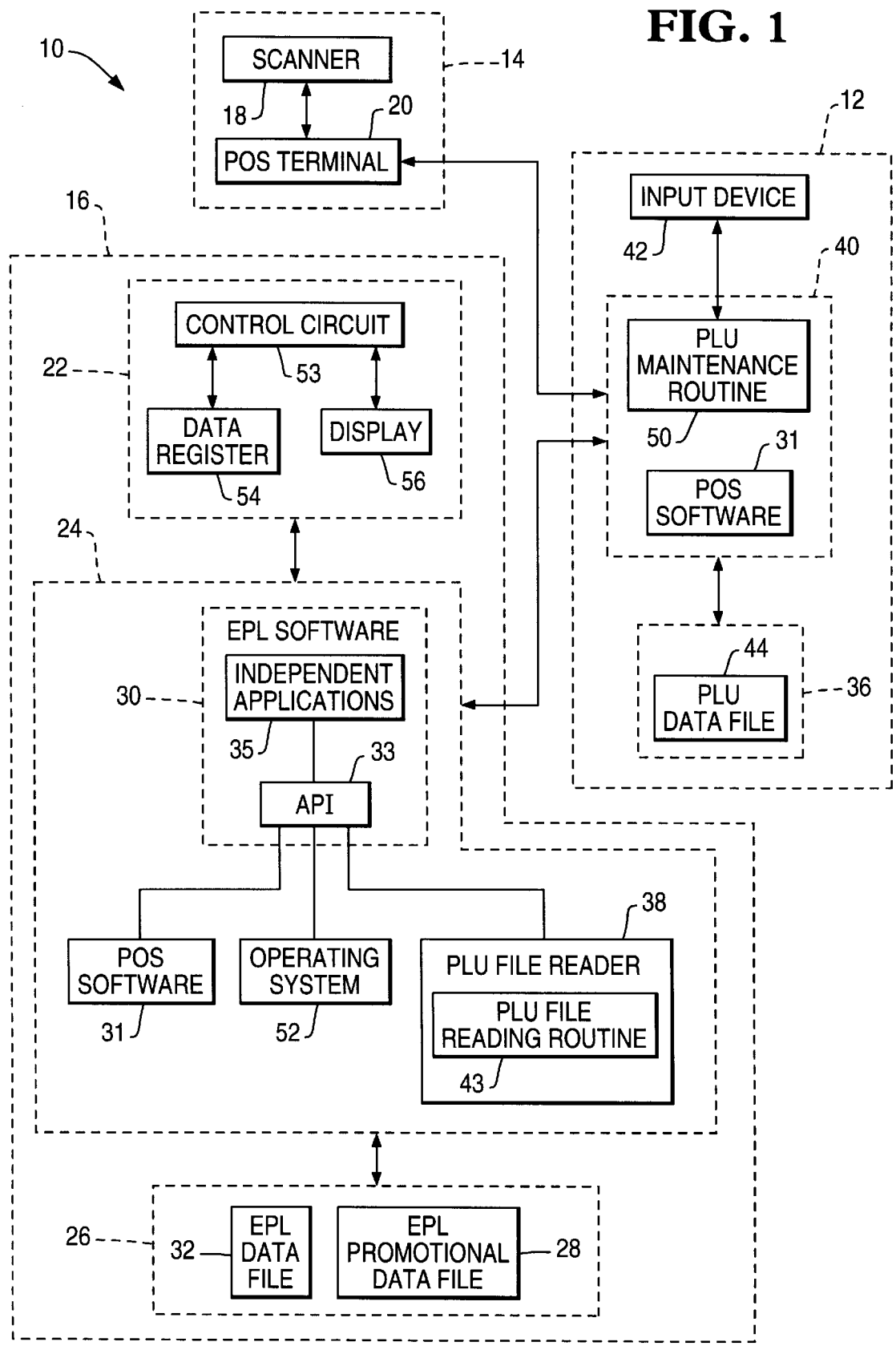
FIG. 1 is a block diagram of a transaction management system.

Referring now to FIG. 1, transaction system 10 preferably includes host computer system 12, point-of-service (POS) system 14, and EPL system 16.

POS system 14 preferably includes bar code scanner 18 and terminal 20.

EPL system 16 preferably includes EPLs 22, host EPL computer 24, and EPL storage medium 26.

EPLs 22 are typically attached to shelves and other locations within a store and include a data register 54, a control circuit 53, and a display 56. Data registers 54 contain data, usually the price of an item associated with an EPL on the shelves. Data register 54 may additionally contain a promotional message.

Control circuit 53 controls the internal operation of EPLs 22. Control circuit 53 receives and stores messages from EPL computer 24 and transmits response messages to EPL computer 24. Control circuit 53 also controls the display of price and promotional messages, including blinking.

Display 56 displays price and promotional messages. Display 56 is preferably a liquid crystal display (LCD).

Host EPL computer 24 executes EPL software 30, which maintains the contents of EPL data file 32. EPL software 30 includes application programming interface (API) 33, which has hooks to operating system 52 or POS software 31. For example, a commercially-available API exists for the UNIX, WindowsNT, and OS/2 operating systems of Novell, Microsoft, and IBM, and the UNITY POS software of NCR Corporation. EPL software 30 includes a suit of independent applications 35 which all have hooks to API 33.

Host EPL computer 24 also executes PLU file reader 38, which is compiled to run on operating system 52 and/or on POS software 31, depending on the needs of the transaction establishment. PLU file reader 38 directly accesses PLU information in PLU data file 44, as an alternative to maintaining a duplicate of PLU data file 44. The PLU information is preferably price information.

PLU file reader 38 is linked to API 33 through inter-process communications and includes PLU file reading routine 43 which works with API 33 to cause POS software 31 or operating system 52 to read PLU data file 44 and transfer PLU information to electronic price label (EPL) software 30. Eliminating the need for a duplicated file also eliminates the possibility of price mismatch occurring between PLU data file 44 and the duplicate file.

Advantageously, none of the other applications 35 have to change if PLU reader 38 is created and placed into system 10. As PLU reader 38 attaches into API 33 via interprocess communications, it isolates independent application programs 35 from the details of PLU maintenance routine 50 and PLU data file 44. PLU reader 38 masks price information in PLU data file 44 into displayable formats for EPL system 16. In many EPL systems, data format 9/9.99 (9 for 9.99) or 99.99 is the maximum price display. As further examples, data format 2/12.40 masks into displayable information 6.20 and data format 10/1.10 masks into displayable information 0.11.

This method proves advantageous in handling advanced pricing methods. For example, one customer may wish to display price information for a "buy one get one free" item differently than price information for another item. PLU reader 38 performs this change a single time and independent applications do not require modification because of this change.

EPL storage medium 26 stores promotional data file 28 and EPL data file 32 are preferably a fixed disk drive.

Host computer system 12 includes PLU storage medium 36, host PLU computer 40, and input device 42.

PLU storage medium 36 stores PLU data file 44. PLU file 44 is preferably the sole location for storing item prices and item information. PLU file 44 also stores promotional indicators associated with promotional messages in EPL promotional data file 28.

Promotional indicators uniquely identify promotional messages, such as "BUY ONE/ GET ONE". EPL 22 may display price separately, or as an integral part of a promotional message. The promotional messages and promotional indicators are arranged as a table in EPL promotional data file 28, such as the one shown below as Table I. Promotional data may be entered and modified using input device 42 and PLU maintenance routine 50.

| Indicator | Promotional Message |
|---|---|
| 00 | (No nessage) |
| 01 | /BUY ONE/ GET ONE |
| 02 | /BUY TWO/ GET TWO |
| 03 | /SPECIAL PURCHASE (blinking) |
| 04 | /(Message 01)/ (Message 02)/ (Message 03). |

PLU file 44 is available for distribution to POS terminal 20 by host PLU computer 40. Alternatively, provision may be made for bar code scanner 18 to directly access primary PLU file 44 from host PLU computer 40.

Here, terminals 20, 24, and 40 are shown as separate components that are networked together, but they may also be combined in different ways. For example, EPL computer 24 and host PLU computer 40 may be combined to form a single host computer. POS terminal 20 and host PLU computer 40 may be combined to form a POS terminal which doubles as a host computer for a network of other POS terminals.

Host PLU computer 40 executes POS software 31 and PLU maintenance routine 50. PLU maintenance routine 50 is controlled by POS software 31 and updates PLU file 44, prepares system 12 for a loss of PLU data file 44, and executes PLU data recovery procedures.

Input device 42 is preferably a keyboard.

PLU maintenance routine 50 may send changes in price and promotional indicators in PLU file 44 directly to EPL computer 24 and POS terminal 20 as they are entered in input device 42 (immediate processing) or store price changes and promotional indicator changes within a batch file for later batch updating (batch processing).

During normal operation, EPL computer 24 executes PLU file reader 38 to obtain price and any promotional indicators from PLU data file 44. EPL software 30 obtains promotional messages associated with the promotional indicators from EPL promotional data file 28 and sends the price information and promotional messages to data register 54. Display 56 displays the price and the promotional message in data register 54.

Figure 2:
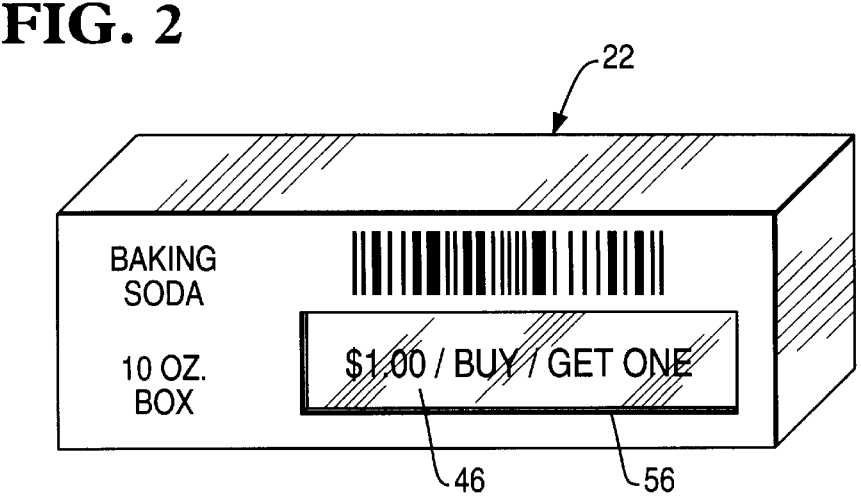
FIG. 2 is a perspective view of an EPL displaying a promotional message.

Turning now to FIG. 2, EPL 22 is shown in more detail. The promotional message 46 is shown as "/BUY ONE/ GET ONE".

Figure 3:
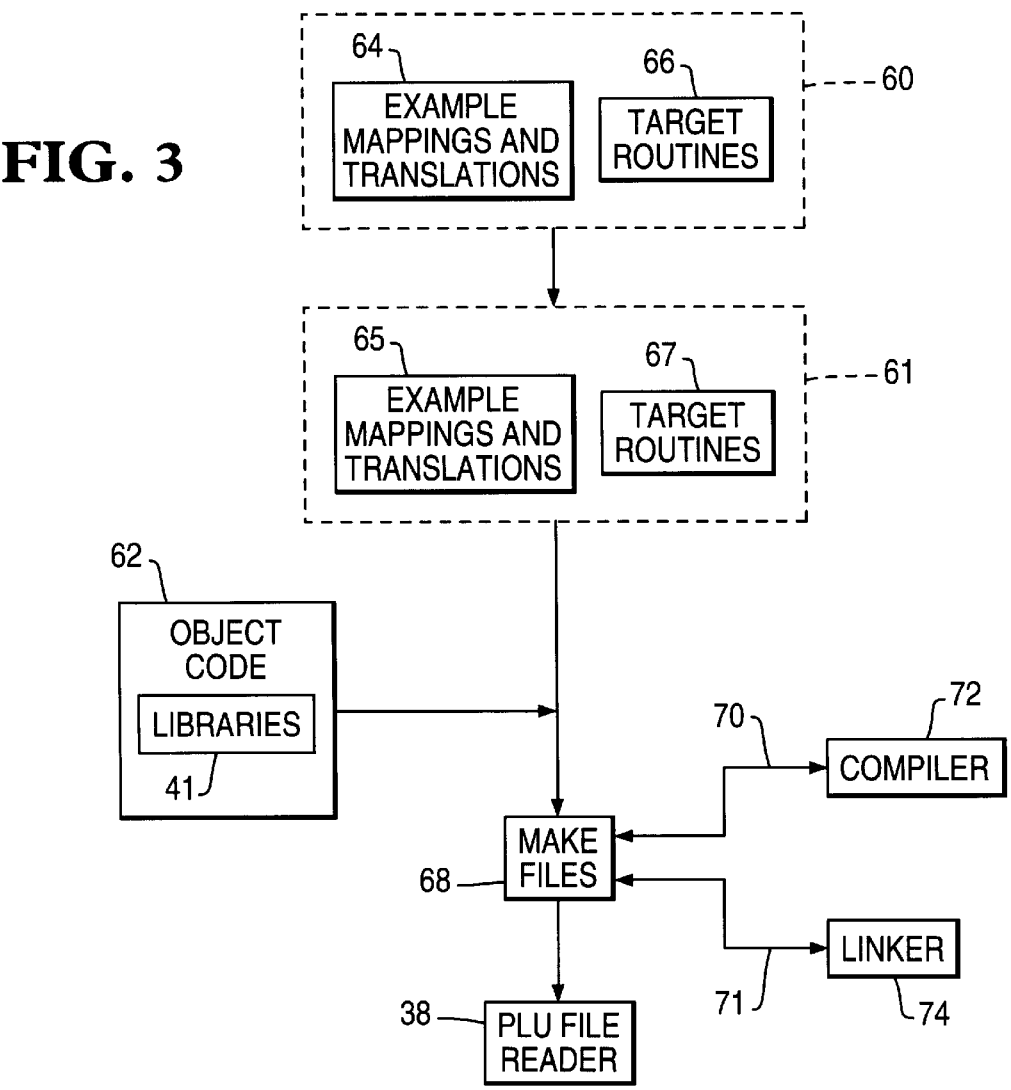
FIG. 3 is a block diagram of a system for producing a PLU file reader program.

Turning now to FIG. 3, the components that are used to construct PLU file reader 38 include template PLU file reader 60, object code 62, example mappings and translations 64, target routines 66, and make files 68. Template PLU reader 60 is a super set of example mappings and translations 64 and target routines 66. Example mappings and translations 64 and target routines 66 are edited and customized by developers to produce customized mappings and translations 65 and customized target routines 67 (customized template PLU reader 61). PLU file reading routine 43 is an example of a customized target routine. Customized mappings and translations 65 and customized target routines 67 along with object code 62 are fed into make files 68 in order to produce executable code for a PLU file reader 38.

Object code 62 consists of libraries 41 that provide an interface into API 33 and isolate all other EPL applications from API 33, thus allowing the existence of PLU file reader 38. Included in libraries 41 are functions to perform module start up, open PLU data file 44, connect an application to PLU data file 44, close an application's connection to PLU data file 44, close PLU data file 44, and to terminate the application.

Example mappings and translations 64 provide non-displayable information (in code and/or in documentation) and may be edited to customize PLU file reader 38.

Target routines 66 are routines that may be edited and customized to suit the needs of the target transaction establishment.

Make files 68 are files that pass source code (edited template 70) through compiler 72 and then pass object code 71 through linker 74 to produce the target executable.

Figure 4:
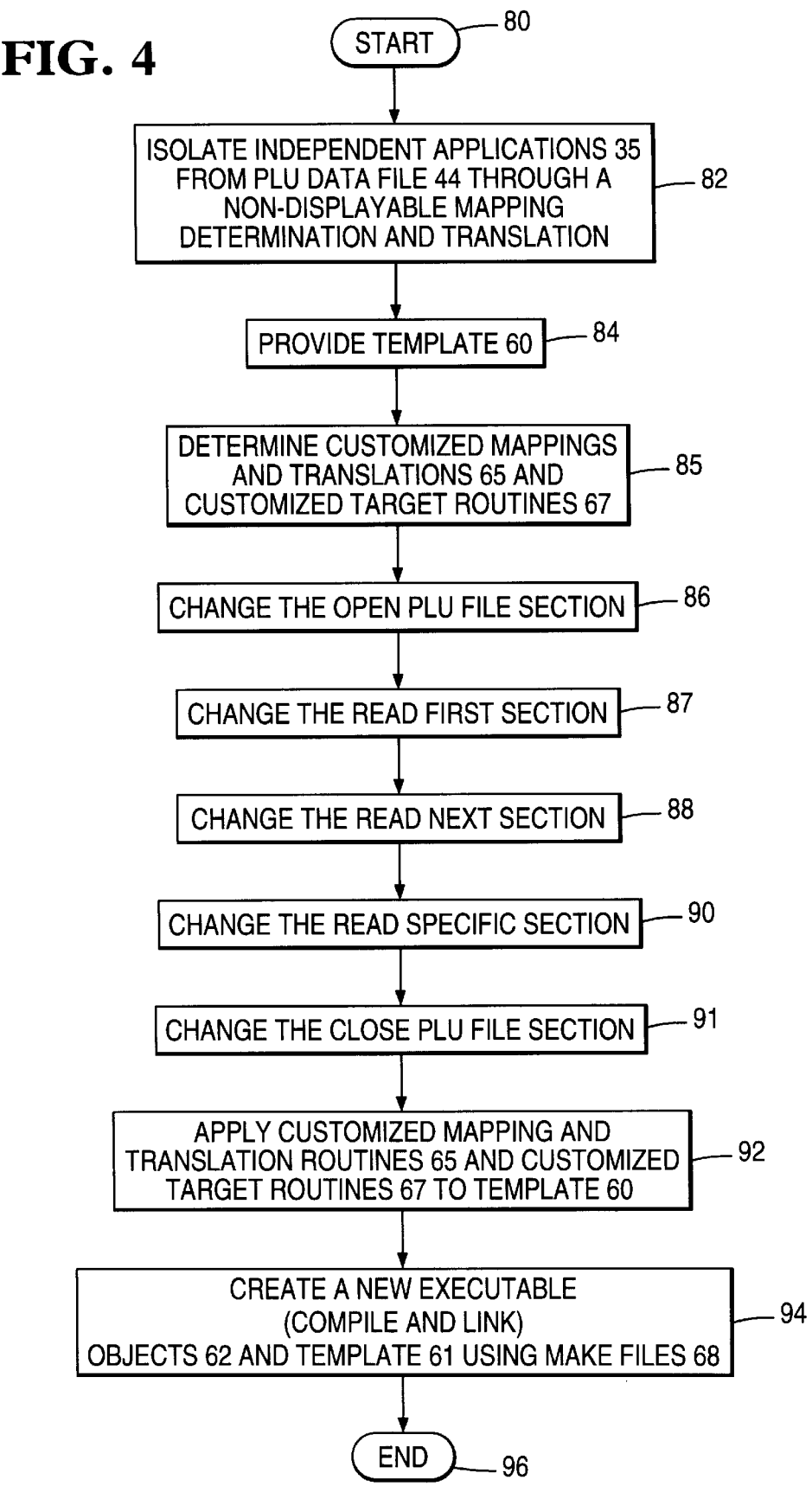
FIG. 4 is a flow diagram illustrating how the PLU file reader is created.

Turning now to FIG. 4 the method of creating generic PLU file reader 38 begins with START 80.

In step 82, independent applications 35 are isolated from PLU data file 44 through a non-displayable mapping determination and translation process. Example mappings and translations 64 result. This original development effort is provided to customers for future customization.

In steps 84, template 60 is provided. Template 60 is packaged in an installable format that can then be distributed and installed on the target system.

In step 85, customized mappings and translations 65 and customized target routines 67 are determined so that all information for an EPL can be displayed. Connection methods that will be employed for the target system are also determined.

In steps 86–92, customized template 61 is produced by changing template 60 to reflect customized mappings and translations 65. This work is performed by developers who are responsible for the integration of EPL system 16 for a target customer. Integration and customization are directed by the customer. This gives the customer the opportunity to gain a competitive advantage by displaying the information required to better serve its customers.

In step 86, the "open PLU file" section is changed. The "open PLU file" section is a routine that must be completed/customized to open the PLU data file 44. The "open PLU file" section must be executed before any of the read sections.

In step 87, the "read first" section is changed. The "read first" section is a routine that must be completed/customized to read the first PLU in PLU data file 44.

In step 88, the "read next" section is changed. The "read next" section is a routine that must be completed/customized to read the next PLU in PLU data file 44 sequentially.

In step 90, the "read specific" section is changed. The "read specific" section is a routine that must be completed/customized to read a specific PLU data file record.

In step 91, the "close PLU file" section is changed. The "close PLU file" section is a routine that must be completed/customized to close the PLU data file 44. The "close PLU file" section must be executed when the calling program no longer wants to read the PLU file 44.

In step 92, customized mapping and translations 65 and customized target routines 67 derived from step 85 are applied to template 60.

In step 94, a new executable (PLU file reader 38) is compiled and linked from object code 62 and template 61 using make files 68, compiler 72, and linker 74.

In step 96, the method ends.

Figure 5:
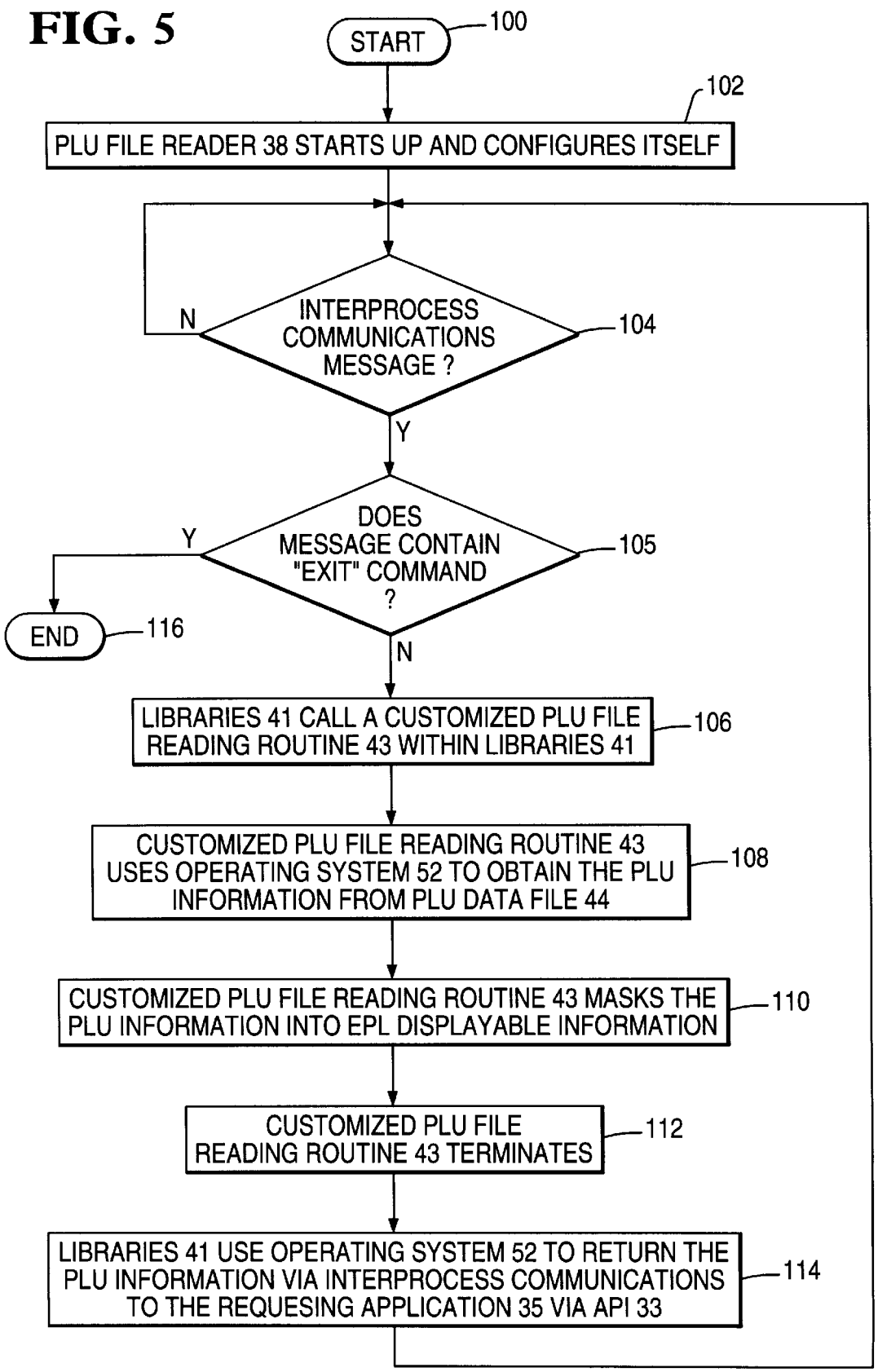
FIG. 5 is a flow diagram illustrating the operation of the PLU file reader program as it is used to obtain promotional indicators from a PLU data file.

Referring now to FIG. 5, the operation of PLU file reader 38 is illustrated in detail, beginning with START 100.

In step 102, PLU file reader 38 starts up and configures itself.

In step 104, PLU file reader 38 waits for an interprocess communications message from API 33. Interprocess communication services (e.g., "queues" for UNIX, threads or pipes for OS/2) are provided by operating system 52. API 33 calls on operating system 52 to send a request from one of independent applications 35 to PLU file reader 38.

For example, this independent application 35 may be control which requests that PLU file reader 38 obtain price information and any promotional indicators so that EPL software 30 may store them in EPL data file 32.

Independent application program 35 issues a call to API 33, instructing API 33 to perform a "read direct" routine provided by API 33. API 33 calls on operating system 52 to send the interprocess communications message to PLU file reader 38. Preferably, API 33 passes the message to libraries 41 within PLU file reader 38.

If such a message is received, PLU file reader 38 determines whether the interprocess communications message contains an "exit" command in step 105. If it does, PLU file reader 38 terminates in step 116.

If the interprocess communications message does not contain an "exit" command, libraries 41 call a PLU file reading routine 43 within libraries 41 in step 106. PLU file reading routine 43 is customized to the needs of the transaction establishment.

In step 108, PLU file reading routine 43 uses operating system 52 to obtain the price information and any promotional indicators from PLU data file 44.

In step 110, PLU file reading routine 43 masks the price information and promotional indicators from PLU data file 44. For example, if application program 35 is a program which controls promotional messages displayed by EPL 22, masking would include converting the promotional indicators into promotional messages that are displayable by EPL 22.

In step 112, PLU file reading routine 43 ends.

In step 114, libraries 41 call on operating system 52 to return the price information and promotional indicators via interprocess communications to the requesting application 35 via API 33. PLU file reader 38 returns to a waiting state in step 104.

After PLU file reader 38 sends the price information and promotional indicators to API 33, API 33 passes the price information and promotional indicators to the requesting application 35. Application program 35 can then display the price information and promotional indicators, compare the information, or otherwise examine the information in accordance with the function of application program 35.

Figure 6:
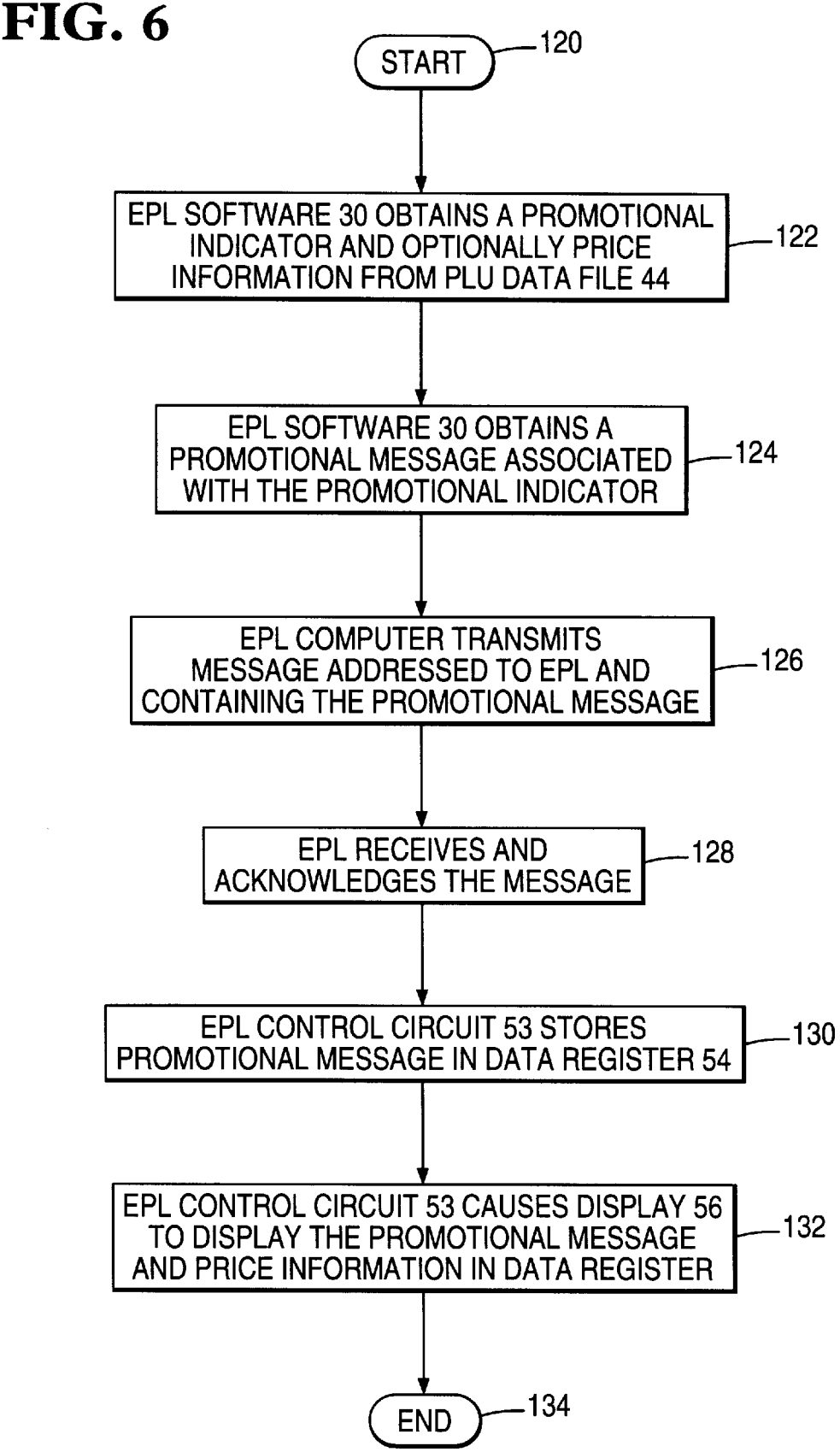
FIG. 6 is a flow diagram illustrating a method of displaying promotional messages by an EPL.

Turning now to FIG. 6, a method of displaying promotional messages by EPL 14 begins with START 120.

In step 122, EPL software 30 obtains a promotional indicator and optional price information from PLU data file 44 using PLU file reader 38.

In step 124, EPL software 30 compares the promotional indicator to promotional indicators stored within EPL promotional data file 28 to obtain a promotional message associated with the promotional indicator.

In step 126, EPL computer 16 transmits a message addressed to EPL 22 which contains the promotional message and the price information.

In step 128, control circuit 53 receives and acknowledges the message.

In step 130, control circuit 53 stores the promotional message and price information in data register 54.

In step 132, control circuit 53 causes display 56 to display the promotional message and price information in data register 54.

In step 134, the method ends.

Although the present invention has been described with particular reference to certain preferred embodiments thereof, variations and modifications of the present invention can be effected within the spirit and scope of the following claims.

What is claimed is:

1. A method of assigning a promotional message to an electronic price label (EPL) associated with an item comprising the steps of:
   (a) storing promotional messages and associated promotional indicators in a promotional data file;
   (b) storing one of the promotional indicators in an item record within a price file;
   (c) reading the price file to obtain the one promotional indicator;
   (d) comparing the one promotional indicator with the promotional indicators in the promotional data file to obtain a promotional message that is associated with the one promotional indicator; and
   (e) causing the EPL to display the promotional message.

2. The method as recited in claim 1, wherein step (e) comprises the substeps of:
   (e-1) transmitting a message addressed to the EPL which contains the promotional message;
   (e-2) receiving and acknowledging the transmitted message by control circuitry within the EPL;
   (e-3) storing the promotional message by the control circuitry; and
   (e-4) displaying the promotional message by the control circuitry.

3. The method as recited in claim 1, wherein step (c) comprises the substeps of:
   (c-1) executing a price file reading program which reads the price file;
   (c-2) providing an application programming interface (API) having hooks into the price file reading program; and
   (c-3) causing the price file reading program to read the price file to obtain the one promotional indicator by the API.

4. The method as recited in claim 3, wherein substep (c-3) comprises the substeps of:
   (c-3-A) sending a call for the one promotional indicator to the API by an application program which manages displaying of the promotional messages;
   (c-3-B) sending a request message for the one promotional indicator to the price file reading program by the API;
   (c-3-C) instructing control software to obtain the one promotional indicator from the price file by the price file reading program;
   (c-3-D) sending the one promotional indicator to the API by the price file reading program; and
   (c-3-E) sending the one promotional indicator to the application program by the API.

5. The method as recited in claim 4, wherein step (c-3-B) comprises the substeps of:
   (c-3-B-1) providing interprocess communications by the control software; and
   (c-3-B-2) establishing interprocess communications with the price file reading program by the API.

6. The method as recited in claim 5, wherein step (c-3-D) comprises the substep of:
   (c-3-D-1) establishing interprocess communications with the API by the price file reading program.

7. The method as recited in claim 4, wherein the control software comprises an operating system.

8. The method as recited in claim 1, further comprising the steps of:
   (f) reading the price file to obtain a price for the item; and
   (g) causing the EPL to display the price.

* * * * *